(12) United States Patent
Amodeo

(10) Patent No.: US 6,959,951 B2
(45) Date of Patent: Nov. 1, 2005

(54) WIRE RACK AND GRILL LIFTING TOOL

(75) Inventor: John C. Amodeo, 7085 Bloomfield Rd., Lot 258, Des Moines, IA (US) 50320

(73) Assignee: John C. Amodeo, Des Moines, IA (US)

( * ) Notice: Subject to any disclaimer, the term of this patent is extended or adjusted under 35 U.S.C. 154(b) by 149 days.

(21) Appl. No.: 10/634,264

(22) Filed: Aug. 5, 2003

(65) Prior Publication Data
US 2005/0029824 A1    Feb. 10, 2005

(51) Int. Cl.⁷ ............................................. F24B 15/00
(52) U.S. Cl. ................... 294/10; 294/2; 294/7
(58) Field of Search .............. 294/2, 7, 9, 10, 294/12, 15, 24, 26, 27.1, 145

(56) References Cited

U.S. PATENT DOCUMENTS

| | | |
|---|---|---|
| 248,805 A * | 10/1881 | Silvey ........................... 7/109 |
| 3,964,775 A | 6/1976 | Boyd |
| 4,471,985 A | 9/1984 | Mahoney |
| 5,314,220 A * | 5/1994 | Clement ....................... 294/10 |
| 5,346,268 A * | 9/1994 | Baker et al. .................. 294/9 |
| 5,515,839 A | 5/1996 | Phillips |
| 5,601,323 A | 2/1997 | Kaiser |
| 5,934,721 A | 8/1999 | Walde |
| 6,039,372 A * | 3/2000 | Noe et al. ..................... 294/10 |
| 6,068,314 A | 5/2000 | Dorazio et al. |
| 6,192,545 B1 | 2/2001 | Gessert |
| 6,334,386 B1 | 1/2002 | Iacchetti |
| 6,464,271 B1 | 10/2002 | Irvin, Jr. |

* cited by examiner

*Primary Examiner*—Dean J. Kramer

(57) ABSTRACT

A lifting tool having a handle connected to a flexible stabilizing member with ends that engage the top surface of a wire rack, and a hook member that extends downwardly from the stabilizing member to engage and receive the wire rack when the stabilizing member is in a compressed position.

18 Claims, 3 Drawing Sheets

WIRE RACK AND GRILL LIFTING TOOL

BACKGROUND OF THE INVENTION

The present invention is directed toward a tool for lifting a wire cooking rack, and more particularly a tool for lifting the cooking rack or grate of a conventional grill.

Tools for lifting wire racks are well known in the art. For example, U.S. Pat. No. 4,471,985 by Mahoney discloses a grill lifting tool having a grill engaging element that uses leverage to lift the grill grate by wedging the engaging element between two grill wires. The engaging element forces the concentration of the grill weight onto two of the wires providing the possibility of bending the wires. In addition the limited width of the engaging element and the grooves therein, provide a very limited attachment and the possibility that the grill rack could tip causing damage and/or injury.

To provide a more stable attachment U.S. Pat. No. 6,068,314 discloses a tool having a handle, a hook, and a stabilizing element that rests on the underside of the rack against several of the rack's parallel wires. Because the stabilizing component engages the underside of the rack the tool is designed for oven racks where the tool can be connected by accessing the rack from the front of the oven, as opposed to the top which would be required for connection to a conventional grill.

Therefore, a primary objective of the present invention is to provide an improved wire rack lifting tool whereby a secure and stable connection with the wire rack can be quickly and easily made.

Another objective of the present invention is to provide a wire rack lifting tool that can be used easily in a variety of situations with a variety of wire racks.

A still further objective of the present invention is to provide a wire rack lifting tool that can be used for performing other cooking functions.

These and other objectives will be apparent from the ensuing description and drawings.

BRIEF SUMMARY OF THE INVENTION

This invention is directed to a wire rack lifting tool and has a handle with a gripping portion at one end and is connected to a flexible stabilizing member at the opposite end. Extending downwardly from the stabilizing member is a hook member that engages the wire rack or grill when the lifting tool is placed on a wire rack and pressure is applied to the handle. When pressure is applied the stabilizing member flexes downwardly such that the hook member engages a wire on the rack. When pressure on the handle is released the stabilizing member returns to its original form and exerts a spring force against the wire rack and the hook to maintain the lifting tool and the wire rack in a secure and stable engagement.

DETAILED DESCRIPTION OF THE PREFERRED EMBODIMENT

Figure 1:
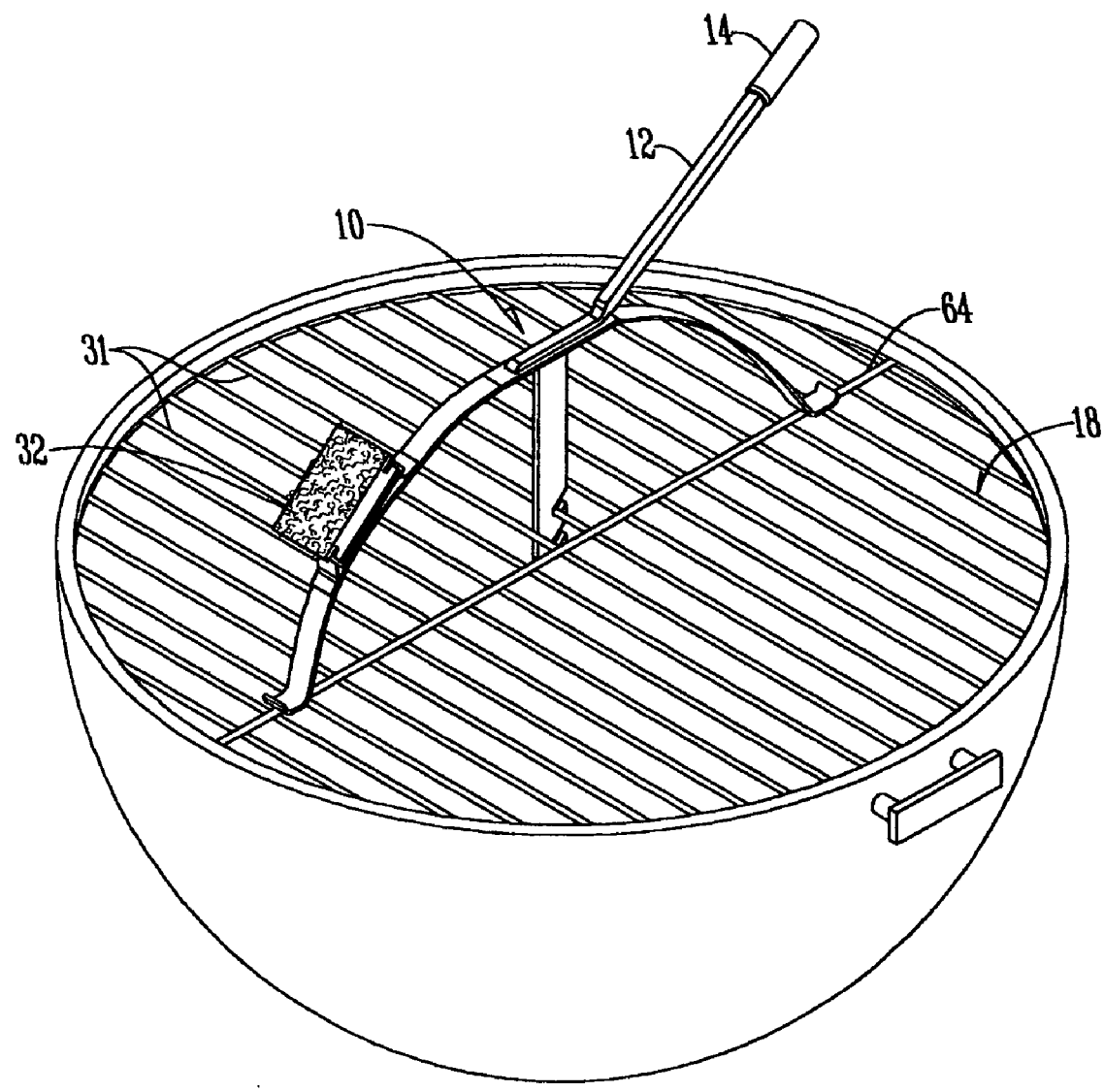
FIG. 1 is a perspective view of the invention used to lift the wire grill from a barbeque broiler.
Figure 2:
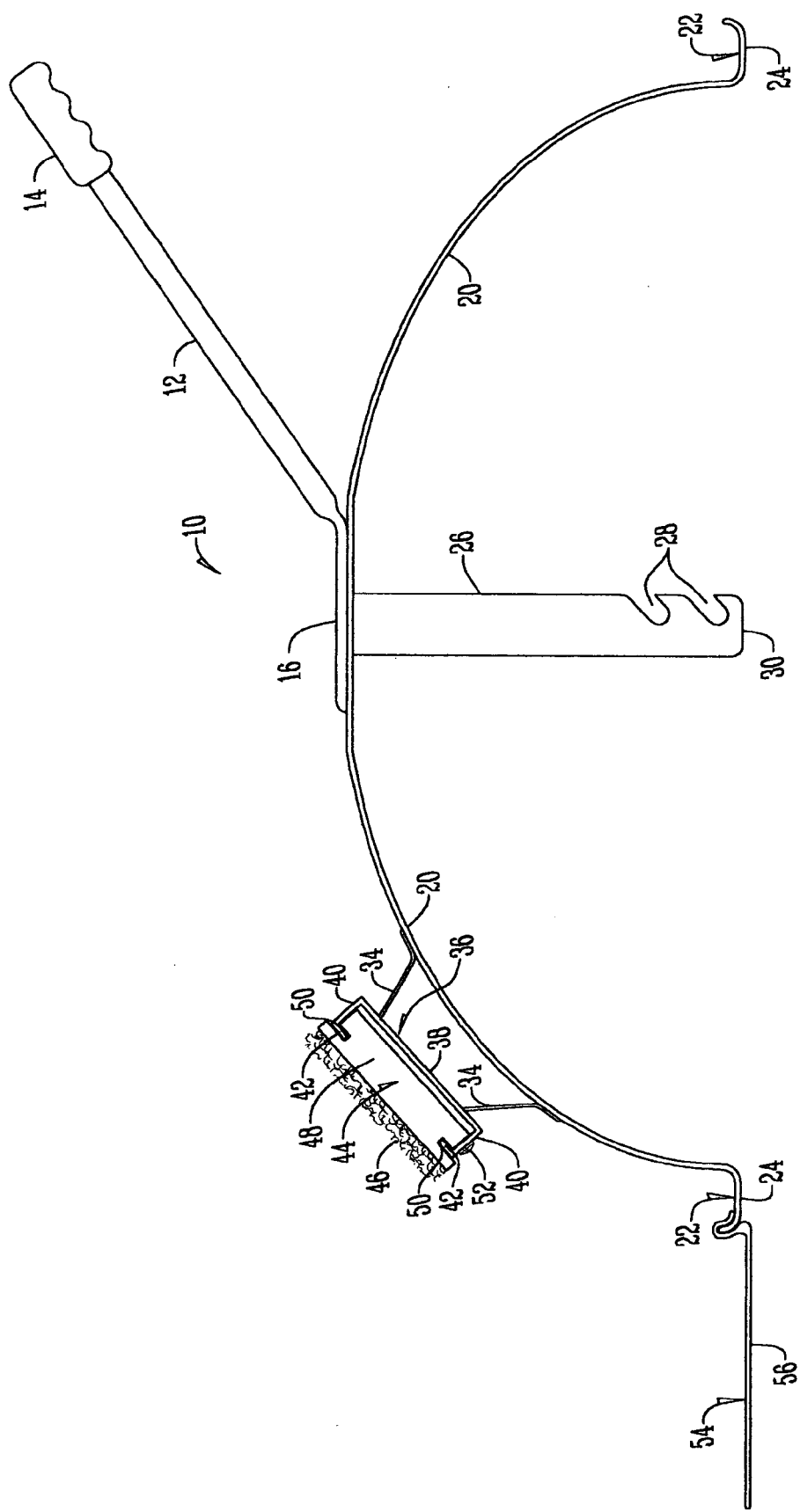
FIG. 2 is a side view of a lifting tool of the present invention.
Figure 3:
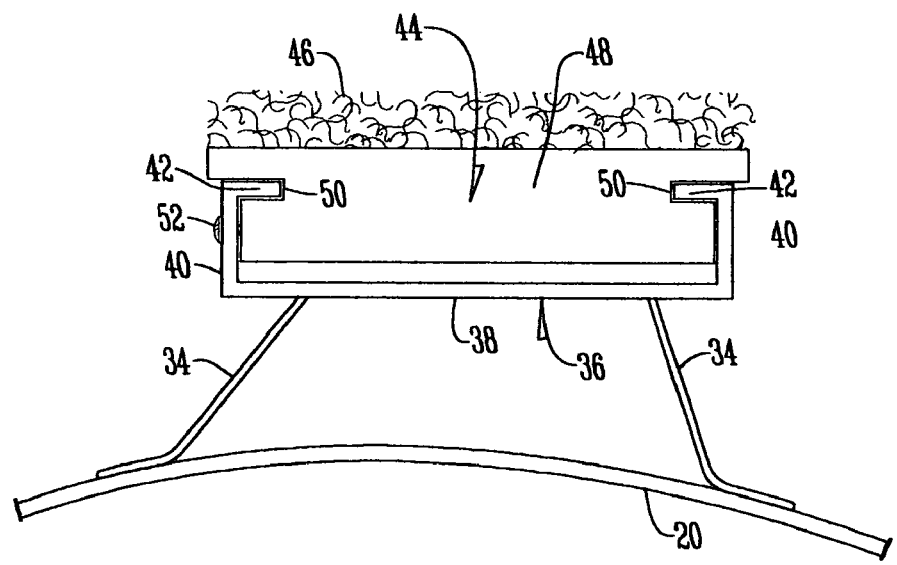
FIG. 3 is an enlarged side view of the brush assembly.
Figure 4:
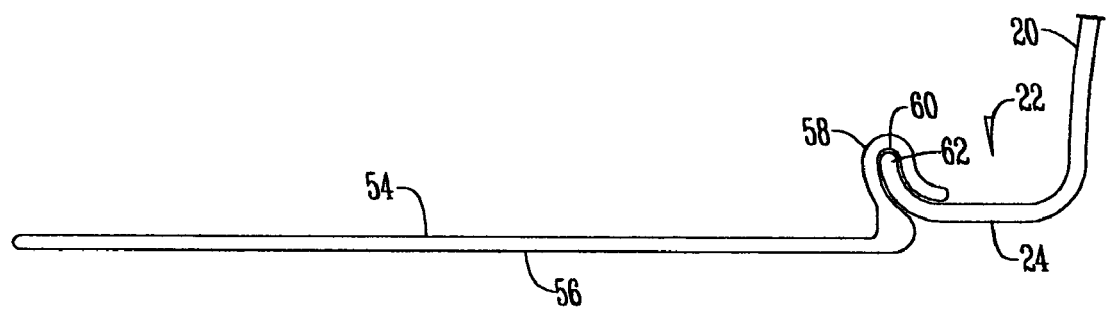
FIG. 4 is an enlarges side view of the spatula attachment.

Referring to the drawings, the lifting tool of the present invention is generally referred to by reference numeral 10. The lifting tool 10 has a longitudinally extending handle 12. The handle preferably has a heat resistant gripping portion 14 at one end and a connecting flange 16 at the opposite end. While the handle can be made in many shapes and configurations, the preferred shape includes a connecting flange 16 that generally resides in a horizontal plane and in parallel alignment with the wire rack 18, with the handle 12 extending upwardly at an angle from the connecting flange 16.

Attached to the connecting flange 16 of the handle 12 is a stabilizing member 20. The stabilizing member 20 preferably is arcuate in shape and of a flexible material such as stainless steel, spring steel or the like. The stabilizing member 20 is attached to the connecting flange 16 in any conventional manner such as by rivets, welding, or the like. The member 20 has opposite ends 22 that extend arcuately downwardly from the connecting flange 16, such that when the stabilizing member 20 is in its natural form the ends 22 engage the wire rack 18 while the handle 12 is raised above the rack 18. Preferably the ends 22 have a horizontal portion 24 that extend across several wires on the rack 18.

Extending downwardly from the stabilizing member 20, and below the connecting flange 16, is a hook member 26. The hook member 26 is connected to the stabilizing member in any conventional manner and has a groove 28 at one end 30 formed to receive a cross wire 31 from the rack 18. A plurality of grooves 28 can be formed in end 30 of the hook member 26 to provide greater ease in attaching the lifting tool 10 to the wire rack 18 and providing varying spring force to secure and stabilize heavier wire racks such as those used for grilling.

Connected to a top surface of the stabilizing member 20 is a removable brush assembly 32. The brush assembly 32 includes extensions 34 that connect the stabilizing member 20 to a retaining bracket 36. The retaining bracket 36 preferably has a central section 38 with ends 40 that are generally perpendicular to the central section 38. Retaining flanges 42 extend inwardly from ends 40 and in parallel spaced alignment with the central section 38. A brush member 44 is partially received and secured within the retaining bracket 36. The brush member 44 has a plurality of bristles 46 that extend outwardly from a block 48. Preferred are bristles made of stainless steel as these bristles are more durable, clean better, and last longer. The block 48 has a pair of side slots 50 that are formed to receive the retaining flanges 42 of the retaining bracket 36. A set screw 52 or the like is threadably received through one of the ends 40 to engage and secure the brush member 44 to the retaining bracket 36. The set screw can either frictionally or threadably engage the block 48.

Removably connected to one of the ends 22 of the stabilizing member 20 is a cooking utensil such as a spatula, fork, or the like 54. Preferred is a spatula having a flat horizontal section 56 with an upwardly extending arcuate flange 58 having a slot 60 that slidably and frictionally receives the tip 62 of end 22. When the tip 62 is secured within slot 60 the spatula 54 can be used in conjunction with the tool 10 for various cooking functions. The spatula 54 can be removed from tip 62 by applying sufficient manual force to overcome the frictional force by sliding the spatula 54 to the side of the tip 62.

In operation the tool 10 is placed on the top of the wire rack 18 such that the ends 22 of the stabilizing member 20 engage the wire rack 18. Manual pressure is then applied to the handle 12 causing the stabilizing member 20 to flex downwardly between and in relation to the ends 22 such that the hook member 26 moves in a downward vertical direction. Sufficient manual pressure is applied so that the hook member 26 moves a sufficient distance such that the hook member 26 engages and receives the center wire 64 from the rack 18 in groove 28. When center wire 64 is retained within groove 28 of the hook member 26 the stabilizing member 20 is maintained in a compressed state whereby the upward force of the stabilizing member 20 is resisted by the groove 28 connected to the wire rack 18 as the stabilizing member 20 returns to its natural position absent manual force. When the stabilizing member is in the compressed position the ends 22 exert a downward force against the top of the wire rack 18 to attach the tool 10 to the wire rack 18 in a secure, stable and safe manner.

When the wire rack 18 does not have a center wire 64 the tool is attached in similar fashion by applying downward force on the handle 12 to cause the hook member 26 to extend between the cross wires 31 of the wire rack 18. The tool 10 is then rotated such that the ends of the stabilizing member 20 slide across the top surface of the wire rack 18 and the hook member 26 rotates so as to receive a cross wire 31 within groove 28.

From the foregoing description it is apparent that this invention provides a lifting tool that can be used with both oven racks and grills to provide a secure and stable attachment for lifting a wire rack.

What is claimed is:

1. A device for lifting a wire rack having a plurality of parallel spaced cross wires, the device comprising:
   a handle;
   a flexible stabilizing member connected to the handle and having ends formed to engage the top surface of the wire rack; a hook member connected to the stabilizing member and formed to receive at least one of the cross wires of the wire rack when the stabilizing member is in a compressed position; and
   wherein the hook member has a plurality of grooves to receive at least one of the cross wires.

2. The device of claim 1 wherein a brush assembly is connected to the stabilizing member.

3. The device of claim 1 wherein a cooking utensil is connected to one of the ends of the stabilizing member.

4. The device of claim 3 wherein the cooking utensil is frictionally connected to the one end of the stabilizing member.

5. The device of claim 1 wherein the stabilizing member has an arcuate shape.

6. A device for lifting a wire rack having a plurality of parallel spaced cross wires, the device comprising:
   a handle having a connecting flange;
   a flexible stabilizing member connected to the connecting flange of the handle and having ends formed to engage the top surface of the wire rack; and
   a hook member connected to the stabilizing member and formed to receive at least one of the cross wires of the wire rack when the stabilizing member is in a compressed position.

7. The device of claim 6 wherein a brush assembly is connected to the stabilizing member.

8. The device of claim 6 wherein a cooking utensil is connected to one of the ends of the stabilizing member.

9. The device of claim 8 wherein the cooking utensil is frictionally connected to the one end of the stabilizing member.

10. The device of claim 6 wherein the stabilizing member has an arcuate shape.

11. The device of claim 6 wherein the hook member has a groove to receive at least one of the cross wires.

12. The device of claim 6 wherein the hook member has a plurality of grooves.

13. A device for lifting a wire rack having a plurality of parallel spaced cross wires, the device comprising:
   a handle;
   a flexible arcuate stabilizing member connected to the handle and having ends with a horizontal flat planar portion formed to engage the top surface of the wire rack; and
   a hook member connected to the stabilizing member and formed to receive at least one of the cross wires of the wire rack when the stabilizing member is in a compressed position.

14. The device of claim 13 wherein a brush assembly is connected to the stabilizing member.

15. The device of claim 13 wherein a cooking utensil is connected to one of the ends of the stabilizing member.

16. The device of claim 15 wherein the cooking utensil is frictionally connected to the one end of the stabilizing member.

17. The device of claim 13 wherein the hook member has a groove to receive at least one of the cross wires.

18. The device of claim 13 wherein the hook member has a plurality of grooves.

* * * * *